March 15, 1927.　　　　F. W. PETERS　　　　1,621,220
UNIVERSAL JOINT
Filed Sept. 16, 1925　　　2 Sheets-Sheet 2
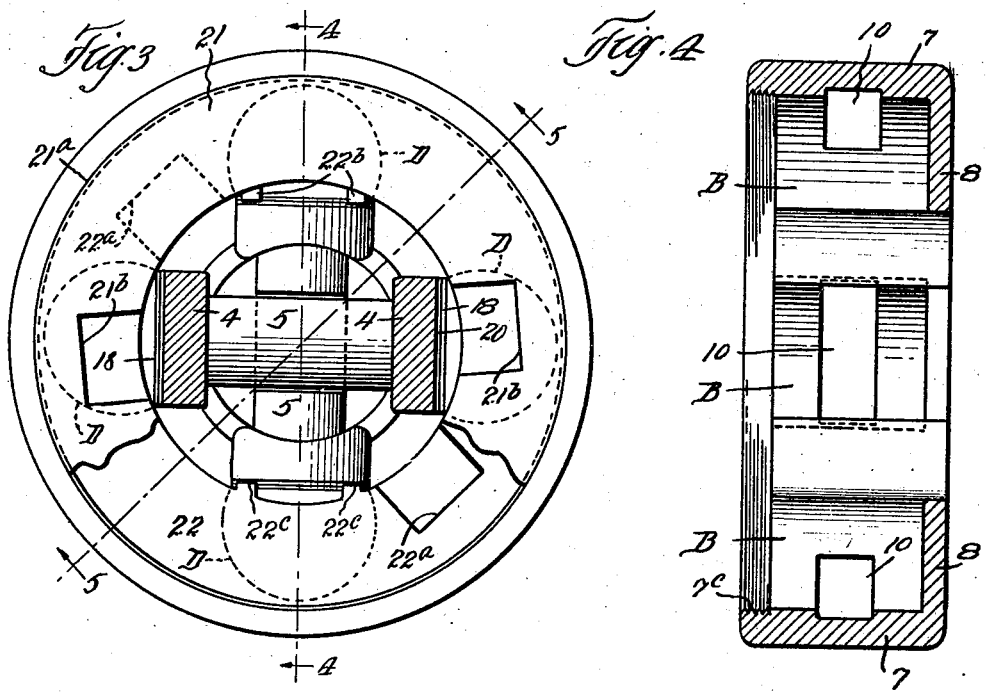
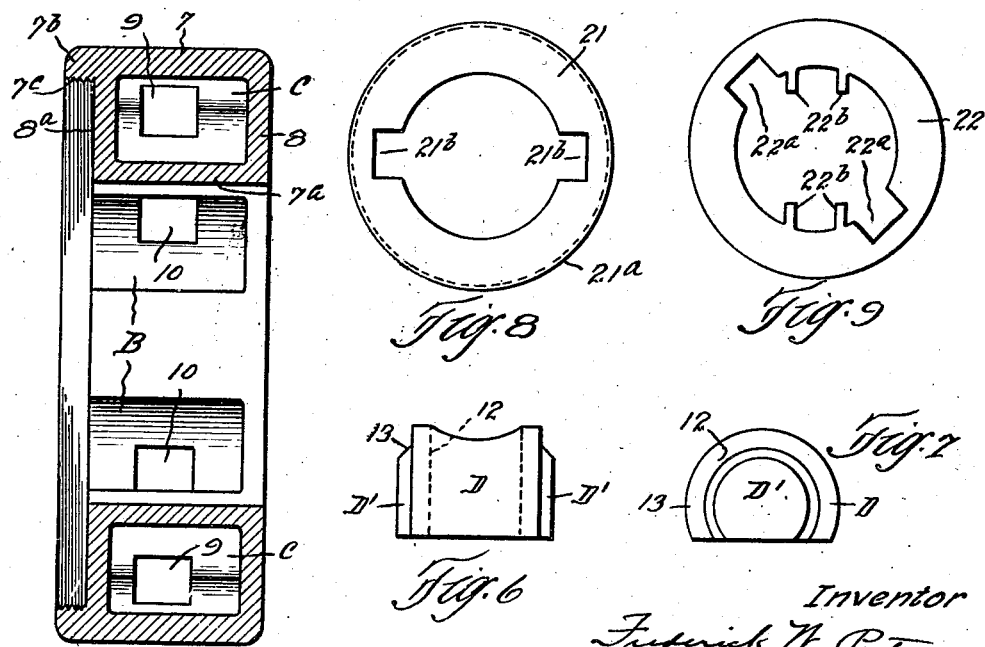

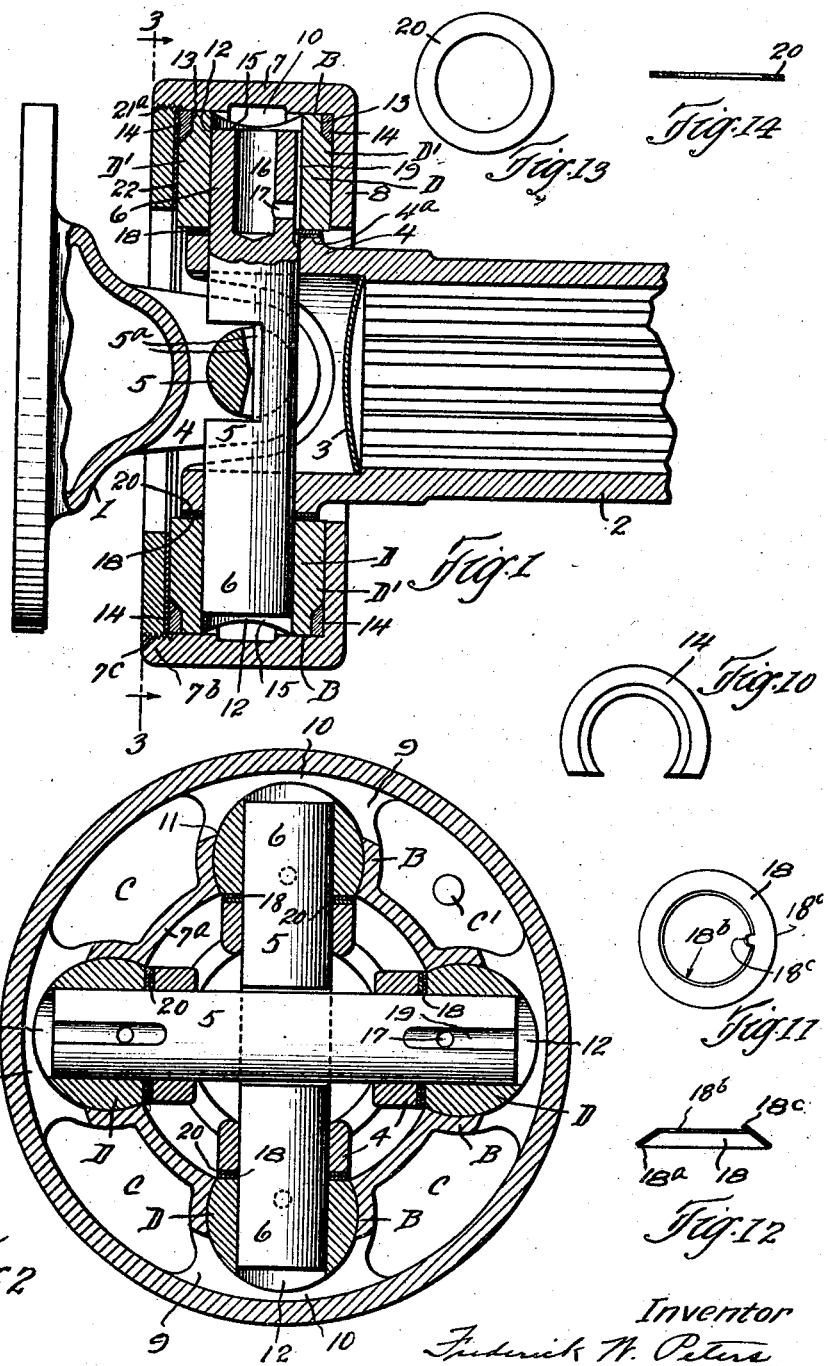

Patented Mar. 15, 1927.

1,621,220

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed September 16, 1925. Serial No. 56,642.

This invention relates to universal joints, and more particularly to joints of the character wherein the trunnions on the end coupling-members are connected with an intermediate hollow lubricant-containing ring through bearing blocks which are inserted in such ring transversely of the latter—that is to say, in a direction that is substantially parallel with the axis of rotation of such ring.

A joint of this general character is shown, described, and claimed in my application 679,596, filed December 10, 1923.

It is the general purpose and object of this invention to provide a joint of the general character referred to wherein the bearing blocks may be mounted in the ring without the necessity for providing openings in one of the side walls of the latter, this manner of mounting the blocks effecting a corresponding reduction in the liability of the lubricant to leak from the ring.

A further object of the invention is to mount the bearing blocks in such manner that the liability to leakage through the openings by means of which the blocks are inserted into the ring and through the bores of such blocks is reduced to a minimum.

A further object of the invention is to mount the bearing blocks within the ring in such manner as to enable the packing material which surrounds the ends of the blocks to be compacted without injury and hence without liability to leakage. A further object of the invention is to provide a construction which will enable the joints to be assembled quickly and conveniently; and a still further object of the invention is to provide a joint capable of realizing all of the foregoing objects in a construction which is economical of production.

I accomplish the foregoing objects, as well as other objects that will appear hereinafter, in and through the construction and arrangement of parts shown in the drawings, wherein Fig. 1 represents a sectional elevation of a universal joint embodying my invention; Fig. 2 a central transverse sectional view through the ring showing the pins and trunnions in elevation; Fig. 3 a view corresponding substantially to the line 3—3 of Fig. 1; Figs. 4 and 5 sectional views through the ring, corresponding respectively to the lines 4—4 and 5—5 of Fig. 3; Figs. 6 and 7 are views in side and end elevation, respectively, of one of the bearing blocks; Figs. 8 and 9 are plan views of the locking ring and gasket, respectively, which are employed to retain the bearing blocks and the packing therefor in place; Fig. 10 a plan view of one of the packing washers such as are employed at the opposite ends of the bearing blocks; Figs. 11 and 12 are details in plan and section, respectively, of one of the washers surrounding each trunnion; and Figs. 13 and 14 are views corresponding respectively to Figs. 11 and 12 of another washer surrounding each trunnion.

Describing the various parts by reference characters, 1 and 2 denote hubs by means of which the joint is connected to shaft sections (not shown), the hub 2 being shown as adapted for a splined connection with its shaft section, the outer end of the hub bore being closed by a plate 3. The hubs are provided each with a yoke, the arms 4 of each yoke having a cross pin 5 mounted therein, the outer ends 6 of each cross pin constituting trunnions. Each cross pin is shown as provided with a central recess $5^a$ of slightly greater depth than the radius of such pin, each recess being about 210° in angular extent to accommodate the rocking movements of the pins. The trunnions are adapted to be mounted in bearing blocks carried by and supported within a connecting member in the form of a ring, the ring being indicated generally at A. The ring is preferably made from malleable iron and is provided with an outer cylindrical wall 7, annular side walls 8 and $8^a$, and an inner cylindrical wall $7^a$, the inner wall being segmental.

Formed in the ring thus provided are transversely extending seats B for the bearing blocks. These seats extend through the side wall $8^a$ and toward the opposite side wall 8; and the block-receiving wall of each such seat is a section of a cylinder having a circumferential extent in excess of 180°, whereby the seats permit the blocks to rock therein while preventing radial inward movement of the said blocks.

It will be noted that the space between the outer wall 7 and the segmental inner wall $7^a$ is divided into a plurality of chambers C, said chambers being separated from each other by means of the side walls of the seats B and by the bearing blocks inserted within such seats. Each chamber C is adapted to communicate with the interior of the seats B on each side thereof through large openings 9 formed in the walls of said seats, thereby to lubricate the outer surfaces of the bearing blocks. The chambers C are enabled to communicate with each other and to provide for the circulation of the lubricant by centrifugal action, by means of the ports 10, formed in the outer portions of the seats, said ports forming passages, beyond the trunnions, connecting the adjacent chambers C. The ports 10 merge at their inner ends with the openings 9. For the purpose of supplying the chambers with lubricant, one such chamber is provided with a filling opening C' closed by a plug.

Cooperating with the seats B are the bearing blocks, each of which is indicated generally at D, the blocks being so shaped as to fit within the said seats and each having an external wall 11 of the same general contour as the wall of its seat, except as such contour is modified by the extension of the cylindrical radial bore 12 therethrough. The inner and the outer end of each block D is reduced, as shown at D', providing at each end a segmental annular seat 13 for the reception of a washer 14, each such extension being concentric with the body of its block.

Each bearing block is provided with a port 15, beyond the trunnion therein, adapted to register with a port 10 and form therewith a continuous passage extending across the end of each trunnion and between the same and the cooperating part of the seat D, the ports 10 and 15 connecting adjacent chambers C. The ports 10 and 15 communicate with a central axial chamber 16 extending inwardly from the outer end of each trunnion, from which chamber a port 17 extends to the seat provided for each trunnion within its bearing block, the ports 17 extending at right angles to the plane of rotation of the ring, as pointed out in my earlier application referred to hereinbefore.

Surrounding each trunnion 6 is a washer 18. This washer, as will appear more particularly from Figs. 11 and 12 normally has its outer edge 18$^a$ in a different plane from its inner edge 18$^b$, the washer being frusto-conical in shape and the inner edge being provided with a tongue 18$^c$ which is adapted to enter a groove 19 formed in the outer cylindrical wall of the corresponding trunnion and with which groove the port 17 communicates. The grooves 19 extend to the ends of their respective trunnions. When in place, the washers 18 are flattened out, as shown in Figs. 1 and 2, with their inner edges 18$^b$ engaging the portions of the bearing blocks which surround the trunnions and their outer edges bearing against the shoulders 4$^a$ on the cooperating yoke arms. To prevent the outer edges of the washers from cutting into the shoulders, I insert a flat washer 20 (see Figs. 13 and 14) between each washer 18 and the adjacent shoulder 4$^a$. This prevents the cutting action referred to and insures a leak-proof joint between each bearing block and the shoulder adjacent thereto.

It will be noted that the outer wall 7 of the ring projects beyond the wall 8$^a$, forming a flange 7$^b$ which is provided with an internal thread 7$^c$. This flange receives a gasket and a locking ring by means of which the bearing blocks D are secured in place. The locking ring is shown in Fig. 8 and comprises an annular body 21 having a thread 21$^a$ on its periphery which is adapted to mesh with the thread 7$^c$. This ring is provided with a pair of opposed notches 21$^b$, the purpose of which will be explained hereinafter.

Between the clamping ring 21 and the adjacent ends D' of the bearing blocks and their packing rings or washers 14, there is interposed a large metal washer or gasket, indicated generally at 22. This gasket is provided with a pair of diametrically opposed notches 22$^a$ and with pairs of tongues 22$^b$ the pairs preferably being arranged diametrically opposite each other.

With the parts constructed and arranged as described, the clamping ring 21 will be slipped over the hub 2, the slots 21$^b$ enabling it to be tilted and slipped successively over the trunnions 6 of the cross pin 5 of the hub 2 and in like manner over the trunnions of the pin carried by the hub 1. The gasket or washer 22 can also be slipped over the same parts in like manner. The bearing blocks can then be applied to the trunnions and the ring A slipped over the hub 2, pressing the blocks into their seats B, with the packing washers 14 in place. The gasket 22 will then be fitted against the adjacent packing washers 14 and the tongues 22$^b$ will be bent into engagement with the inner flat faces of an opposed pair of such blocks, as indicated at 22$^c$ on Fig. 3, thus holding the said gasket against rotation. The clamping ring 21 may then be threaded into its seat within the flange 7$^b$. By using the gasket 22, the packing material 14 (which is preferably compressible) will not be injured by setting up the clamping ring, thus insuring a leak-proof joint between such packing material and the gasket, the compression of the packing material at the opposite ends of the bearing blocks also preventing leakage about such ends.

By reason of the construction illustrated and described herein, I am enabled to provide a joint which is simple in construction and economical of production; which is readily assembled and disassembled; which will reduce to a minimum the number of machining operations; and which will be particularly efficient in preventing the leakage of lubricant from the lubricating connecting ring.

Having thus described my invention, what I claim is:—

1. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, packing material interposed between the inner end of each bearing block and the bottom of the seat therefor, a clamping ring adjustably mounted on the opposite end of the ring from the bottoms of said seats, and packing material interposed between the outer end of each bearing block and said ring.

2. In a universal joint, the combination, with a driving and a driven member and trunnions carried thereby, of a hollow lubricant-containing connecting ring for said trunnions, the said ring having side walls and seats extending transversely thereof from and through one side wall toward and terminating short of the outer surface of the opposite side wall, bearing blocks for said trunnions in said seats, packing material interposed between the inner end of each bearing block and the bottom of the seat therefor, a clamping ring mounted on the opposite end of the ring from the bottoms of said seats, and packing material interposed between the outer end of each bearing block and said ring, the said blocks and seats being so shaped as to permit the blocks to rock in the seats.

3. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, packing material interposed between the inner end of each bearing block and the bottom of the seat therefor, packing material at the outer end of each bearing block, a gasket adapted to engage the packing material at the outer ends of the bearing blocks, and a clamping ring mounted upon the first mentioned ring and adapted to force the gasket toward the outer ends of the bearing blocks and the packing material therefor.

4. In a universal joint, the combination, with a driving and a driven member and trunnions carried thereby, of a hollow lubricant-containing connecting ring for said trunnions, the said ring having seats extending transversely thereof from and through one side toward and terminating short of the outer surface of the opposite side, bearing blocks for said trunnions in said seats, packing material extending about the peripheral portion of the inner end of each bearing block, packing material extending about the peripheral portion of the outer end of each bearing block, and a clamping ring mounted upon the first mentioned ring and adjustable toward and from the outer ends of said blocks, the said blocks and seats being so shaped as to permit the blocks to rock in the seats.

5. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions adapted to be inserted in said seats, each block having a reduced extension at each end thereof, packing material in the seat formed by each such extension, a gasket adapted to engage the packing material at the outer ends of the bearing blocks, and a clamping ring threaded to the first mentioned ring and adapted to engage the said gasket.

6. In a universal joint, the combination, with a driving and a driven member and trunnions carried thereby, of a hollow lubricant-containing connecting ring for said trunnions, the said ring having seats extending transversely thereof from and through one side toward and terminating short of the opposite side and intersecting the inner wall thereof, bearing blocks for said trunnions adapted to be inserted in said seats, each block having a reduced segmental extension at each end thereof, packing material in the segmental seat formed by each such extension, a gasket adapted to engage the packing material at the outer ends of the bearing blocks, and a clamping ring threaded into an overhanging flange on the first mentioned ring and adapted to engage the said gasket, the said blocks being provided each with a radial bore for a trunnion that is adapted to register with an opening formed by the intersection of its seat with the inner wall of the ring, the said blocks and seats being so shaped as to permit the blocks to rock in the seats.

7. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, each block having reduced ends providing peripheral seats, packing material in said seats, a gasket adapted to engage the packing material at the outer end of said blocks, and a clamping ring adjustably mounted on the said connecting ring and adapted to force the gasket toward the said outer ends and the packing material therefor.

8. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats each block having reduced ends providing peripheral seats, packing material in said seats, said connecting ring having a flange projecting beyond the outer wall thereof, a gasket fitted within said flange and adapted to engage the packing material at the outer ends of the blocks, and a clamping ring threaded into said flange and adapted to force the said gasket toward such outer ends and the packing material therefor.

9. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, packing material for the opposite ends of said blocks, a gasket adapted to engage the packing material at the outer ends of said blocks, and a clamping ring adjustably mounted on the said connecting ring and adapted to force the gasket toward the said outer ends and the packing material therefor, the said blocks and seats being so shaped as to permit the blocks to rock in the seats.

10. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, packing material for the opposite ends of said blocks, said connecting ring having a flange projecting beyond the outer wall thereof, a gasket fitted within said flange and adapted to engage the packing material at the outer ends of the blocks, and a clamping ring threaded into said flange and adapted to force the said gasket toward such outer ends and the packing material therefor.

11. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, packing material for the opposite ends of said blocks, packing material in said seats, a gasket having a pair of opposed radial slots adapted to accommodate trunnions and to enable the gasket to be slipped over such trunnions and having, between said slots, radially inwardly extending tongues adapted to engage bearing blocks, and a clamping ring also having a pair of opposed slots adapting it to be slipped over the trunnions, the said connecting ring having a flange adapted to receive the gasket and the said clamping ring being threaded into said flange.

12. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, a gasket having inwardly extending tongues adapted to engage one or more bearing blocks, the said connecting ring having a flange adapted to receive the gasket, and a clamping ring threaded into said flange.

13. In a universal joint, the combination, with a driving and a driven member and trunnions carried thereby, of a hollow lubricant-containing connecting ring for said trunnions, the said ring having seats extending transversely thereof from and through one side toward and terminating short of the opposite side, bearing blocks for said trunnions in said seats, each block having reduced ends providing peripheral seats, packing material in said peripheral seats, a gasket having a pair of diametrically opposed radial slots adapting it to be slipped over the trunnions, a clamping ring also having a pair of diametrically opposed radial slots adapted it to be slipped over the trunnions, the gasket having diametrically opposed pairs of tongues adapted for engagement with bearing blocks, and adjustable connecting means between the clamping ring and the connecting ring.

14. In a universal joint, the combination of a member having a trunnion and a shoulder from which said trunnion projects, a bearing member for said trunnion, a washer surrounding the said trunnion, the said washer being of spring metal and normally having one edge thereof in a different plane from the other edge whereby when assembled between the said shoulder and the said bearing member, one edge of such washer will be forced into engagement with one of such parts, and a second washer interposed between the other edge of the first washer and the other of such parts.

15. In a universal joint, the combination of a member having a trunnion and a shoulder from which said trunnion projects, a bearing member for said trunnion, a washer surrounding the said trunnion, the said washer being of spring metal and normally having one edge thereof in a different plane from the other edge whereby, when assembled between the said shoulder and the said bearing member, one edge of such washer will be forced into engagement with the bearing member; and a flat washer interposed between the opposite edge of the said washer and the said shoulder.

In testimony whereof, I hereunto affix my signature.

FREDERICK W. PETERS.